July 11, 1961     F. R. L. DALEY, JR     2,991,634
UNIVERSAL JOINT CENTERING DEVICE
Filed July 29, 1960
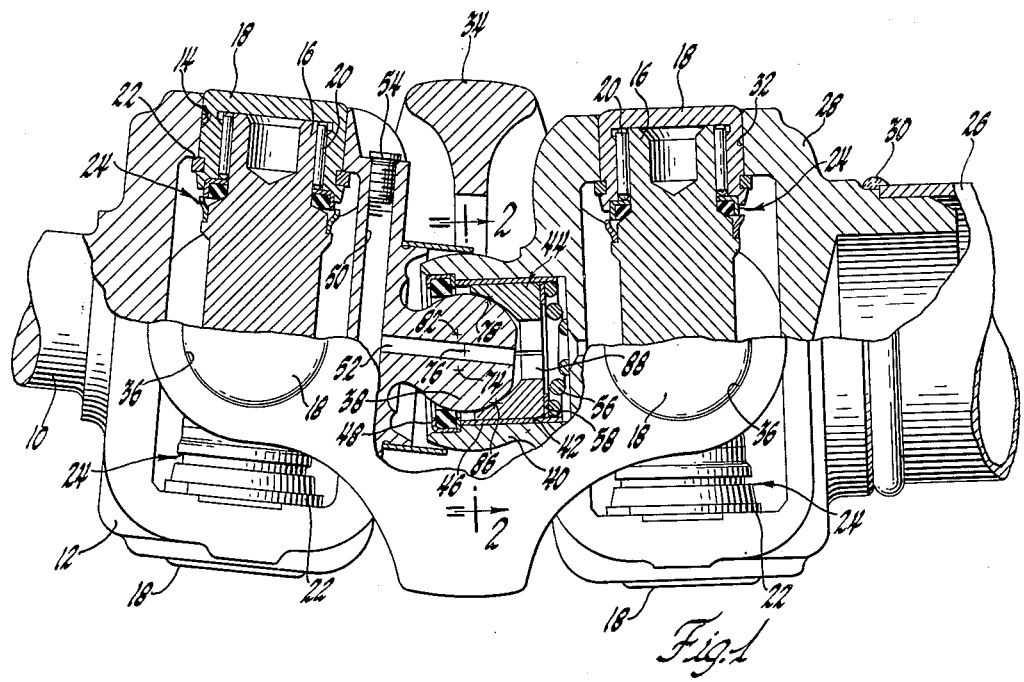
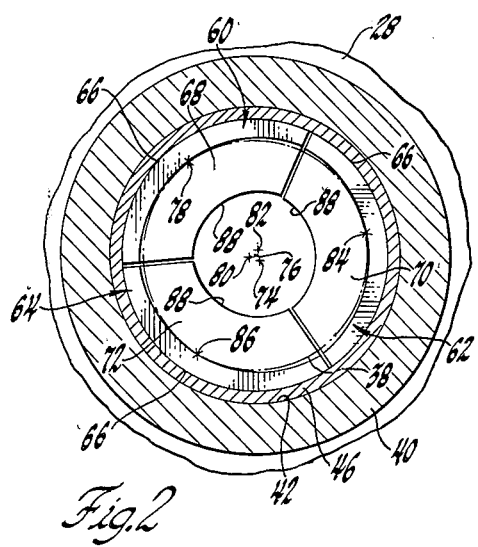
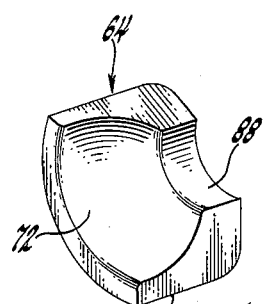
INVENTOR.
Frank R. L. Daley, Jr.
BY
E. W. Christen
ATTORNEY

United States Patent Office 2,991,634
Patented July 11, 1961

2,991,634
UNIVERSAL JOINT CENTERING DEVICE
Frank R. L. Daley, Jr., Fenton, Mich., assignor to General Motors Corporation, Detroit, Mich., a corporation of Delaware
Filed July 29, 1960, Ser. No. 46,202
5 Claims. (Cl. 64—21)

This invention relates to universal joints, and more particularly to a means for centering a constant velocity universal joint.

In motor vehicle manufacture, and particularly the drive line therefor, it is becoming increasingly important to provide means for lowering the drive line and eliminating the objectionable tunnel within the floor of the vehicle. One manner of accomplishing this result is to use a drive line of several pieces, so arranged geometrically as to present the lowest possible configuration. In so doing, it may be necessary to provide a propeller shaft of several sections angularly disposed with respect to each other, requiring universal joints to transmit the driving torque from one piece to the next. The double cardan constant velocity universal joint is a well known structure which may be employed between two pieces of the drive line to provide the proper driving torque transmission.

In generally available constant velocity universal joints, and particularly the double cardan type universal joint, low wear characteristics and manufacturing tolerances make use thereof objectionable because of the construction of the centering means. The usual centering arrangement is a ball and socket type of construction which does not permit wear takeup nor effectively eliminate vibrations and the like caused by manufacturing tolerances and clearances between the various parts. In the usual double cardan universal joint any tolerances between the ball and the socket will cause vibration and noise plus a considerable amount of chucking and resultant deformation of parts.

It is becoming increasingly common to manufacture the socket means in the form of several shoes spring biased toward the centering ball to take up manufacturing tolerances. However, even with this construction there are problems in the tolerance control as to the contours and shape of the ball seats which are used to support the centering ball. Excessive variation of dimensional limits allows a variation in the pressure angle of the ball upon the seat portions. Since the ball seat must retain the ball in position under relatively high radial or lateral loads, failure to control the pressure angle allows the axial component of the radial load to overcome the force of the biasing spring. If the axial component of side load overcomes the force of the spring, the seat may be forced away from the ball permitting free wobble in the centering device and defeating its function. Additionally, variations from the usual maximum to minimum required ball size may permit contact of the ball at the edges of the seat members when the seat is a minimum size and the ball a maximum size. This condition is extremely undesirable because of the concentrated load at a weak point and a very small area. Furthermore, the use of two ball seats to support the centering ball is theoretically defective in centering in that if the seats are large enough in diameter to admit the ball and unless the seats and ball match perfectly in size, there are two points of contact, 180° apart, and one on each seat. At right angles to the axis between the contact points there is relatively little retention, permitting the ball to flop in the ball seats.

The device in which this invention is embodied comprises, generally, centering device including a three-piece socket means which provides three-point contact with the centering ball. Inner spherical surfaces are formed in the centering shoes and from a different center than the spherical surface of the centering ball. This maintains as little area of contact as possible and permits three-point contact at approximately 120° intervals. This effectively eliminates the problems of two contact points and no side retention and, further, allows for the variations in tolerances and the possibility of mixing maximum sized balls and minimum sized ball seats. Furthermore, the lateral load on the centering ball is more evenly distributed and does not tend to overcome the force of biasing spring. The action of the three ball seats is similar to a three jawed chuck, providing positive centering.

These and other objects and advantages will become more apparent from the following description and drawing, in which:

FIGURE 1 is an elevational view of a double cardan type universal joint with parts broken away and in section to illustrate the centering means;

FIGURE 2 is an enlarged cross-sectional view of the centering means of the universal joint shown in FIGURE 1 illustrating the position of the various parts; and FIGURE 3 is an isometric view of one of the centering shoes illustrated in FIGURES 1 and 2.

Referring more particularly to the drawing, the universal joint is best described with reference to FIGURE 1. A drive shaft portion 10 is connected to, or may be integral with, a conventional cardan yoke member 12 which has a pair of oppositely disposed bores 14 to receive the usual spider 16 and bearing caps 18 in the conventional manner. Bearing caps 18 are supported on the spider cross arms by an annulus of needle bearings 20 and held in place in the yoke 12 by a suitable retaining ring 22. A seal and retaining member 24 protects the annulus of needle bearings 20 and secures the bearings in their proper position.

Similarly, a shaft portion 26 is connected to a second universal joint yoke 28 in any suitable manner, as by welding, illustrated at 30. However, any suitable manner for connecting the yoke 28 to the shaft portion 26 may be utilized. Yoke 28 is also provided with oppositely disposed bores 32 receiving a spider 16 and bearing caps 18, as above described with respect to yoke member 12. A connecting member 34 extends between the two yokes 12 and 28 and is provided with bores 36 to receive the remaining bearing caps on spider assemblies 16. The connecting member 34 serves as the structural torque transmitting member from yoke 12 to yoke 28, or vice versa, through the spiders 16 and bearing caps 18.

Extending axially of yoke member 12 is a centering ball 38 which is substantially spherical and extends toward the opposite yoke member 28. A tubular extension 40 having a cylindrical bore 42 formed therein extends from yoke member 28 and in the direction of and enclosing ball 38. Disposed within the extension 40 is the centering socket means, illustrated generally by the numeral 44, which will be hereinafter fully described. A bushing 46 is disposed in the bore 42 of the extension 40 to provide the proper surface for the centering means 44. A seal and retainer combination, illustrated by the numeral 48, protects the interior of the tubular extension 40 and the socket means 44. In order to lubricate the centering device, a passage 50 may be provided at yoke 12 and a bisecting passage 52 formed centrally of the centering ball 38. A plug or suitable grease fitting 54 may be provided to close the passage 50.

Also disposed in the bore 42 in the shaft extension 40 is a coil spring 56 engaging the end wall of the bore and adapted to engage a suitable washer 58 placed behind the socket means 44. The purpose of spring 56 is to bias the socket means into engagement with the centering ball 38.

FIGURES 2 and 3 are enlarged views of the socket means shown in FIGURE 1. The socket means includes three centering shoes, identified by numerals 60, 62 and 64. Each of these centering shoes are substantially a third of a cylinder, outer surfaces 66 being right circular cylinders and cooperating with the cylindrical surface of the bore 42 in extension 40. Each of the shoes is provided with an internal spherical concave surface 68, 70 and 72, respectively, to receive the centering ball 38. It is desirable to make the spherical surfaces 68, 70 and 72 slightly larger in radius than the radius of spherical ball 38. To accomplish this result, the center of spherical surface 68 is shown in FIGURE 2 at 74 and is radially displaced from the center 76 of the spherical ball 38. Referring back to FIGURE 1, center point 74 is also shown to be axially displaced from center 76 of the spherical ball 38. With this point as a center, spherical surface 68 is then larger in radius than the spherical surface of the ball 38 and a single point of contact 78 is provided between the ball 38 and the shoe 60. This is true of shoes 62 and 64, the center of shoe 62 being shown at 80 in FIGURE 2 and the center of shoe 64 being shown at 82 in FIGURE 2. Center point 82 is also shown in FIGURE 1 as being displaced axially from the ball center 76. Thus, point contact at 84 and 86 is provided between the ball 38 and shoes 62 and 64, respectively. In FIGURE 2, ball 38 is shown in dashed and dotted lines illustrating the point contact with the centering shoes.

Centering shoes 60, 62 and 64 may be provided with circular openings 88 at the rearward end thereof to provide proper lubricant throughout the centering means.

When the universal joint is assembled, as shown in FIGURE 1 and in operation of the universal joint, it may be seen that spring 56, through washer 58, forces the centering shoes 60, 62 and 64 into engagement with the ball 38. The three-point contact at 78, 84 and 86, 120° intervals, provides the proper loading on the centering ball and prevents any lateral movement thereof. Manufacturing tolerances and clearances are taken up by the spring 56 tending to move the centering shoes toward the ball 38, and any wear that occurs between the parts will be taken up by this movement by spring 56. Thus, the centering ball 38 will always be maintained in its proper position with respect to yokes 12 and 28 to provide substantially constant velocity operation of the universal joint. The joint has an extremely long life, due to the wear takeup and tolerance takeup features and the normal vibration and noise problems are eliminated. Optimum loading on the centering ball is provided and the loading is such that there is no axial component of force available to overcome the force of the spring 56.

What is claimed is:

1. Centering means for a constant velocity universal joint having first and second yoke members, said centering means comprising a stud extending from said first yoke member and toward said second yoke member, a spherical ball formed on the end of said second stud and having a center substantially midway between said first and second yoke members, a tubular extension formed from said second yoke member and extending toward and enclosing said ball, and three centering shoes disposed in said extension and having spherical cavities formed therein, each of said spherical cavities having a radius larger than the radius of said ball, each of said shoes engaging said ball and with substantially point contact to properly position said ball and maintain said ball in such position for proper operation of said universal joint.

2. The centering means set forth in claim 1, and further including a spring disposed in said tubular extension and biasing said shoes toward said ball to take up clearances between said shoes and said ball.

3. Centering means for a constant velocity universal joint having first and second yoke members, said centering means comprising a stud extending from said first yoke member and toward said second yoke member, a spherical ball formed on the end of said second stud and having a center substantially midway between said first and second yoke members, a tubular extension formed from said second yoke member and extending toward and enclosing said ball, and socket means disposed in said extension and engaging said ball, said socket means including three shoes having substantially spherical cavities formed therein, said shoes having cylindrical outer surfaces of substantially the same diameter as the internal diameter of said tubular extension, and each of said spherical cavities having a radius greater than the radius of said ball and maintaining substantially point contact with said ball to properly maintain said ball in position for optimum operation of said universal joint.

4. The centering means set forth in claim 3, and further including a spring disposed in said tubular extension and biasing said socket means toward said ball to take up clearances between said socket means and said ball.

5. Centering socket means for a constant velocity universal joint having first and second yoke members and a ball extending from one of said yoke members and a tubular extension extending from the other of said yoke members and enclosing said ball, said socket means comprising three shoes, each of said shoes having a concave spherical surface formed therein and the outer surface thereof being cylindrical, the center of each of said spherical surfaces being axially and radially outwardly spaced from the center of said ball such that the radius thereof is greater than the radius of said ball, each of said shoes being receivable in said tubular extension to form a ball receiving socket and adapted to engage said ball with substantially point contact to properly position said ball therein.

References Cited in the file of this patent

UNITED STATES PATENTS

| | | |
|---|---|---|
| 2,067,286 | Pearce | Jan. 12, 1937 |
| 2,947,158 | King | Aug. 2, 1960 |